(12) United States Patent
Giancotti et al.

(10) Patent No.: US 10,920,669 B2
(45) Date of Patent: *Feb. 16, 2021

(54) FULL TURBOMACHINERY MODULE FOR LNG PLANTS OR THE LIKE

(71) Applicant: Nuovo Pignone Tecnologie Srl, Florence (IT)

(72) Inventors: Marco Giancotti, Florence (IT); Andrea Righeschi, Florence (IT); Luciano Guidotti, Florence (IT); Michele Cecarini, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 154 days.

This patent is subject to a terminal disclaimer.

(21) Appl. No.: 16/073,191

(22) PCT Filed: Feb. 16, 2017

(86) PCT No.: PCT/EP2017/053482
§ 371 (c)(1),
(2) Date: Jul. 27, 2018

(87) PCT Pub. No.: WO2017/140765
PCT Pub. Date: Aug. 24, 2017

(65) Prior Publication Data
US 2019/0041127 A1 Feb. 7, 2019

(30) Foreign Application Priority Data
Feb. 18, 2016 (IT) .................. 102016000016865

(51) Int. Cl.
*F02C 7/20* (2006.01)
*F02C 7/143* (2006.01)

(52) U.S. Cl.
CPC ............. *F02C 7/20* (2013.01); *F02C 7/143* (2013.01)

(58) Field of Classification Search
CPC ........ F25J 1/0259; F25J 1/0278; F25J 1/0296; F25J 1/0022; F25J 1/0283; F25J 2290/42;
(Continued)

(56) References Cited

U.S. PATENT DOCUMENTS

| 4,717,030 A * | 1/1988 | Ebata ............... F01D 25/285 212/271 |
| 2003/0143071 A1 | 7/2003 | Ootoshi et al. |

(Continued)

FOREIGN PATENT DOCUMENTS

| EP | 2 426 452 A1 | 3/2012 |
| GB | 2 328 720 A | 3/1999 |

(Continued)

OTHER PUBLICATIONS

International Search Report and Written Opinion issued in connection with corresponding PCT Application No. PCT/EP2017/053482 dated Apr. 26, 2017.

(Continued)

*Primary Examiner* — William H Rodriguez
(74) *Attorney, Agent, or Firm* — Baker Hughes Patent Org

(57) ABSTRACT

A modular gas turbine system is disclosed. The system includes a base plate and a gas turbine engine mounted on the base plate. The gas turbine engine is drivingly coupled to a rotating load mounted on the base plate. A supporting frame extends above the base plate. A first bridge crane and a second bridge crane are movably supported on the supporting frame.

16 Claims, 5 Drawing Sheets

(58) Field of Classification Search
CPC .......... F25J 1/0282; F25J 1/0285; F25J 1/029; F25J 2230/20; F01D 15/08; F01D 25/28; F02C 7/143; F05D 2230/72; F05D 2230/68; F05D 2260/02; F05D 2240/91
See application file for complete search history.

(56) References Cited

U.S. PATENT DOCUMENTS

| | | | |
|---|---|---|---|
| 2015/0184591 A1* | 7/2015 | Giancotti | F02C 7/20 |
| | | | 60/798 |
| 2016/0010916 A1 | 1/2016 | Byfield | |
| 2017/0138218 A1* | 5/2017 | Waki | F02C 7/04 |
| 2018/0283279 A1* | 10/2018 | Hatcher, Jr. | B66C 19/02 |
| 2018/0347469 A1* | 12/2018 | Giancotti | F01D 25/28 |
| 2019/0055887 A1* | 2/2019 | Giancotti | F25J 1/0296 |
| 2019/0161989 A1* | 5/2019 | Murata | B66C 17/04 |

FOREIGN PATENT DOCUMENTS

| | | |
|---|---|---|
| WO | 2013/176727 A2 | 11/2013 |
| WO | 2013/182697 A1 | 12/2013 |

OTHER PUBLICATIONS

International Preliminary Report on Patentability issued in connection with corresponding PCT Application No. PCT/EP2017/053482 dated Aug. 21, 2018.

* cited by examiner

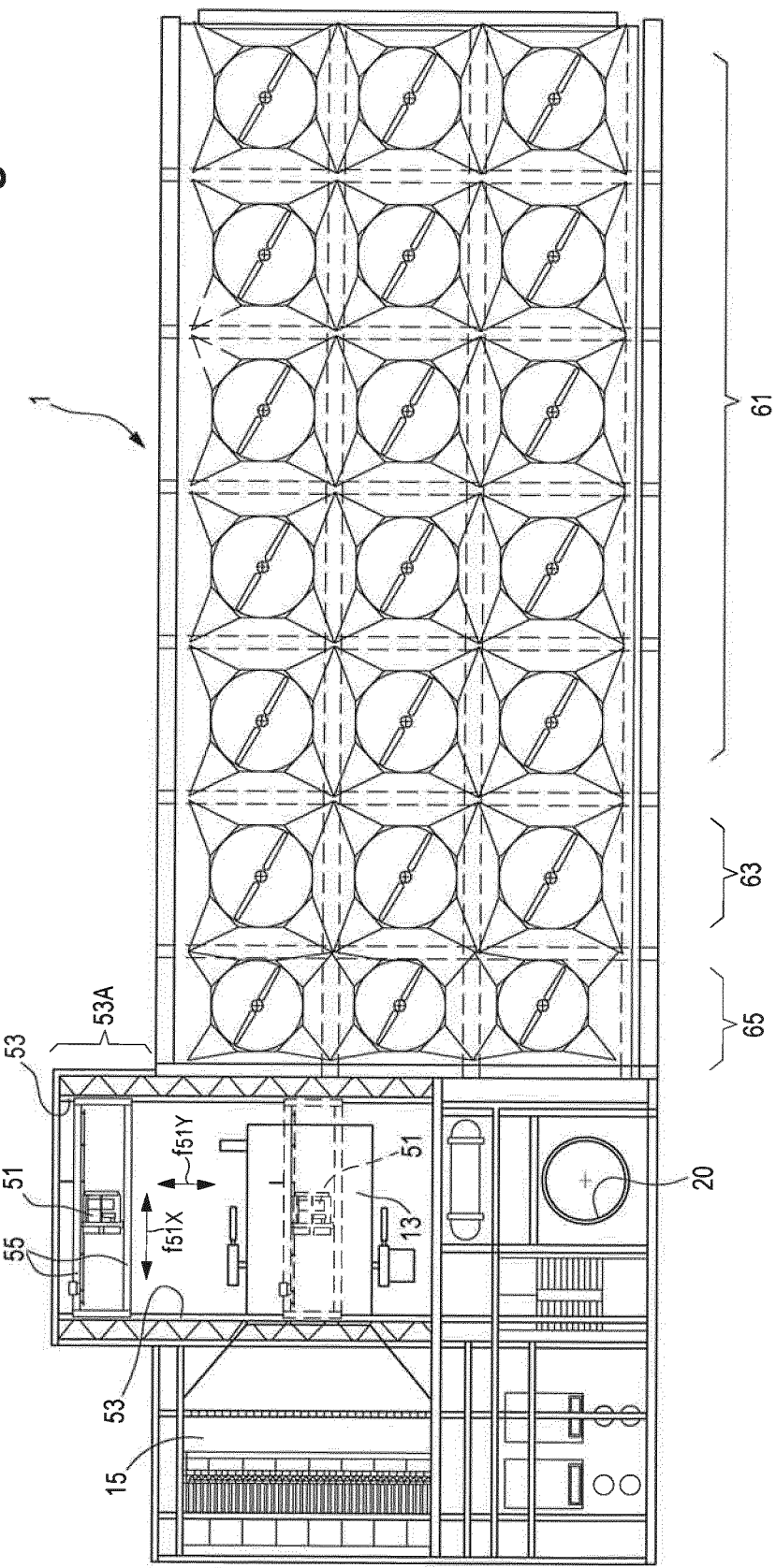

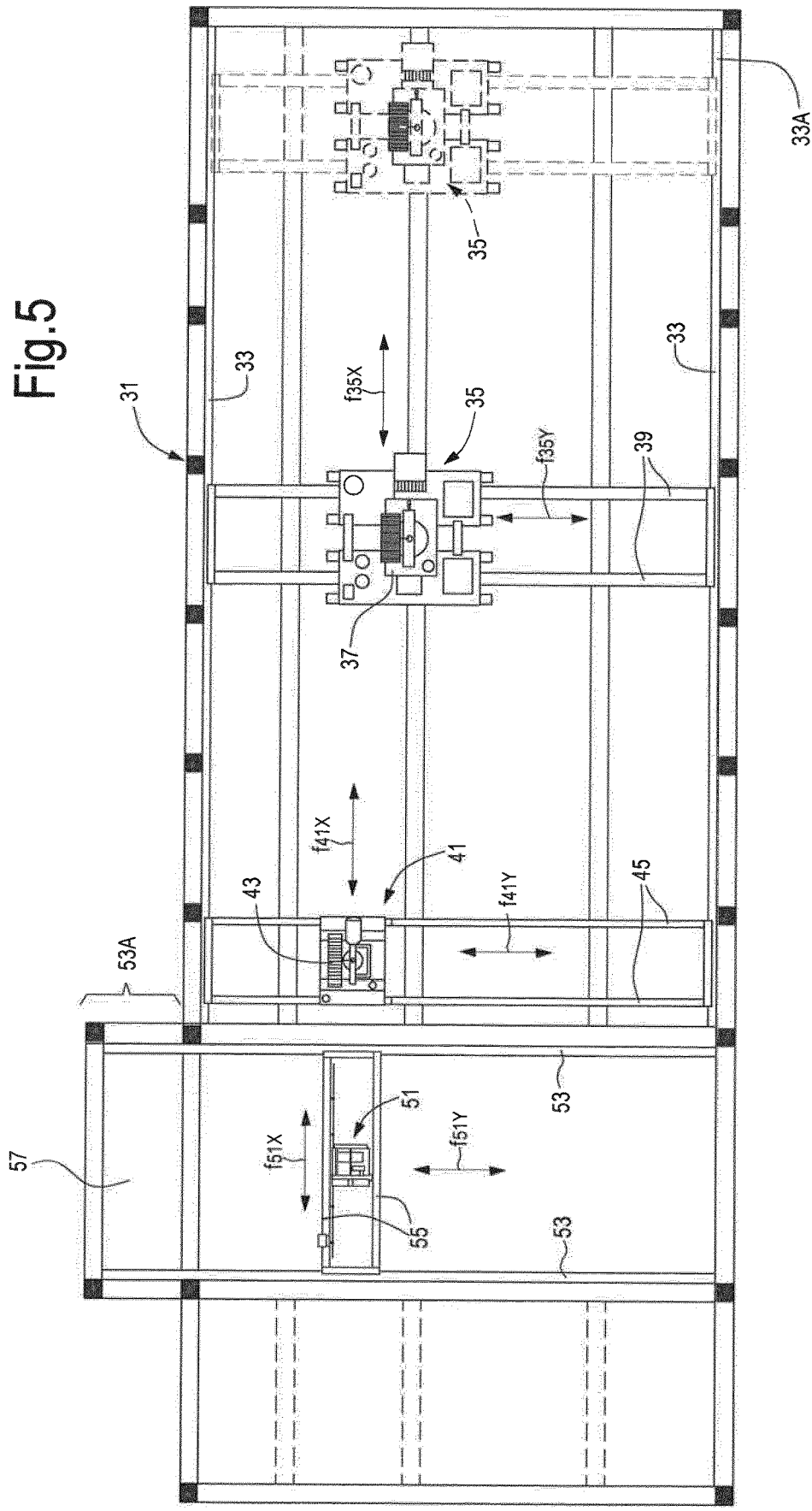

FULL TURBOMACHINERY MODULE FOR LNG PLANTS OR THE LIKE

TECHNICAL FIELD

The disclosure relates to gas turbine systems. Embodiments disclosed herein specifically concern gas turbine systems for mechanical drive applications. Some exemplary embodiment concern gas turbine systems for on-shore LNG plants, including one or more gas compressors driven by a gas turbine engine.

BACKGROUND OF THE INVENTION

Gas turbines are widely used as prime movers in power generation or industrial plants, for driving rotating loads, such as electric generators or turbomachines.

In off-shore installations, compressors driven by aero-derivative gas turbines having a power rate lower than 40 MW are often used, due to their compact structure and reduced overall dimensions. Modularization of gas turbines having a power rate lower than 40 MW is a quite common practice. The gas turbine and the load are arranged on a common frame, thus forming a single unit which is tested in the erection and testing yard or site prior to being transported to final destination. The common frame is then transported to final destination and mounted on a skid. A modular arrangement of this kind is particularly useful, since it allows complete assembling and testing of the rotary machines prior to shipping and installation to final destination.

Large gas turbines, both aero-derivative gas turbines as well as heavy duty gas turbines above 40 MW, are usually not modularized due to their large dimensions. Commonly, the various components of a gas turbine plant are transported separately from the site of manufacturing to the final destination. The foundation is prepared at the final site of destination and the individual machines are then mounted on the foundation. Due to the different radial dimensions of the various plant components, such as the gas turbine, the electric generator and the starter, the foundation is sometimes designed with machine-supporting surfaces at various different levels. The rotary machines must then be aligned, mechanically connected to one another and tuned. The entire process is extremely time-consuming.

US2015/0184591 discloses a modularized heavy-duty gas turbine engine for power generation, used for driving an electric generator.

Erection of the plant requires relatively long time, intervention of highly specialized staff, as well as the use of cumbersome machinery.

The system comprised of the gas turbine engine and the load must be periodically subject to maintenance. Parts of the system must be inspected and in some cases components, such as one or more rotors of the rotary machines, or the full machines must be replaced. Maintenance operations require plant shut down and a relatively long period of inactivity, which in turn causes production losses with a serious financial impact.

Maintenance interventions should be scheduled and performed such as to reduce the required manpower and the total period of inactivity of the plant and consequently improve availability thereof.

There is still a need for improvements in the field of large gas turbine engines, specifically in order to reduce the negative impact of erection and running costs derived from maintenance interventions

SUMMARY OF THE INVENTION

A modular gas turbine system for on-shore LNG plants or the like is disclosed herein. The modular gas turbine system comprises a base plate and a gas turbine engine having a rotation axis, mounted on the base plate. The modular system is configured for being transportable. The system further comprises at least one rotating load, mechanically coupled to the gas turbine engine and mounted on the base plate, and a supporting frame extending above the base plate. A first bridge crane and a second bridge crane are movably supported on the supporting frame, such as to move above the gas turbine engine and the load.

The bridge cranes are configured and arranged for handling pieces of machinery installed on the base plate. For instance, one of the first bridge crane and second bridge crane can be arranged and configured for handling machinery components of the rotating load, or of the gas turbine engine or both. In some embodiments one of the first bridge crane and second bridge crane can be arranged such as to operate in an area where the rotating load is arranged, while the other of the first and second bridge crane is arranged such as to operate in the area where the gas turbine engine, or parts thereof is located.

The first bridge crane and the second bridge crane can be movable according to two horizontal, mutually orthogonal control axes.

In some embodiments, the first bridge crane and the second bridge crane are movable on common rails mounted on the supporting frame. The operating areas and the movements of the first bridge crane and second bridge crane along the common rails will in this case be designed such that collision of the two bridge cranes and loads carried thereby are avoided, but at the same time the two bridge cranes can operate in parallel. For instance, a first bridge crane can be arranged and controlled to handle pieces of machinery of the gas turbine engine, and the second bridge crane can be arranged and controlled to handle pieces of machinery of the load or vice versa.

The common rails along which the first bridge crane and the second bridge crane are movably arranged can be parallel to the rotation axis of the gas turbine engine.

The operation areas of the first bridge crane and of the second bride crane can have an overlapping zone, such that machine components can be moved from one operation area to the other by suitable control of the first bridge crane and second bridge crane.

In some embodiments, a common lay down area can be provided on a side of the base plate, for instance at the end of the common rails along which the first bridge crane and second bridge crane move. In some embodiments the common lay down area can be located at the end of the base plate opposite the gas turbine engine.

An operating area of one of the first bridge crane and second bridge crane can be arranged above the gas turbine engine, while an operating area of the other of said first bridge crane and second bridge crane can be arranged between the operating area of the one of said first bridge crane and second bridge crane and the lay down area. Pieces of machinery can be moved from the gas turbine engine to the lay down area by transferring them from one bridge crane to the other bridge crane.

An intermediate lay down area on the base plate can be provided, where machinery pieces or components are released by one of the first bridge crane and second bridge crane and engaged by the other of the first bridge crane and second bridge crane, for moving them between two positions located anywhere on the base plate, irrespective of whether the two positions are in the area of operation of one or of the other of said first bridge crane and second bridge crane.

In some embodiments, at least one of the first bridge crane and second bridge crane is movable on rails extending substantially parallel to a rotation axis of the gas turbine engine, while the other of said first bridge crane and second bridge crane can be movable along second rails extending substantially orthogonal to the rotation axis of the gas turbine engine.

The modular gas turbine system can further comprise a third bridge crane movably supported on the supporting frame. In such case, the first bridge crane and the second bridge crane can be movably arranged on first rails supported by the supporting frame and the third bridge crane can be movably arranged on second rails supported by the supporting frame, the first rails and the second rails being mutually, approximately orthogonal to one another.

The second rails can project horizontally beyond the footprint of the base plate, up to a respective lay down area arranged on a side of the base plate.

The modular gas turbine system can comprise an air filter housing and an air inlet duct extending from the air filter housing towards the gas turbine engine. In some embodiments, the second rails can extend above the air inlet duct.

The modular gas turbine system described herein can be part of an on-shore LNG system for the liquefaction of natural gas. The rotating load driven by the gas turbine engine can comprises at least one gas compressor, configured for processing a refrigerant gas of the LNG system. A separate process module can be provided, whereon the components of the LNG system different from the refrigerant gas compressors, are arranged, such as the heat exchangers and the expanders.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. Embodiments of the invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of embodiments of the present invention. It is important, therefore, that the claims be regarded as including such equivalent constructions insofar as they do not depart from the spirit and scope of embodiments of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 4 illustrates a top plan view of the modularized gas turbine system according to line IV-IV of FIG. 1;

FIG. 5 schematically illustrates the crane bridge arrangement in a top plan view.

DETAILED DESCRIPTION

Figure 1:
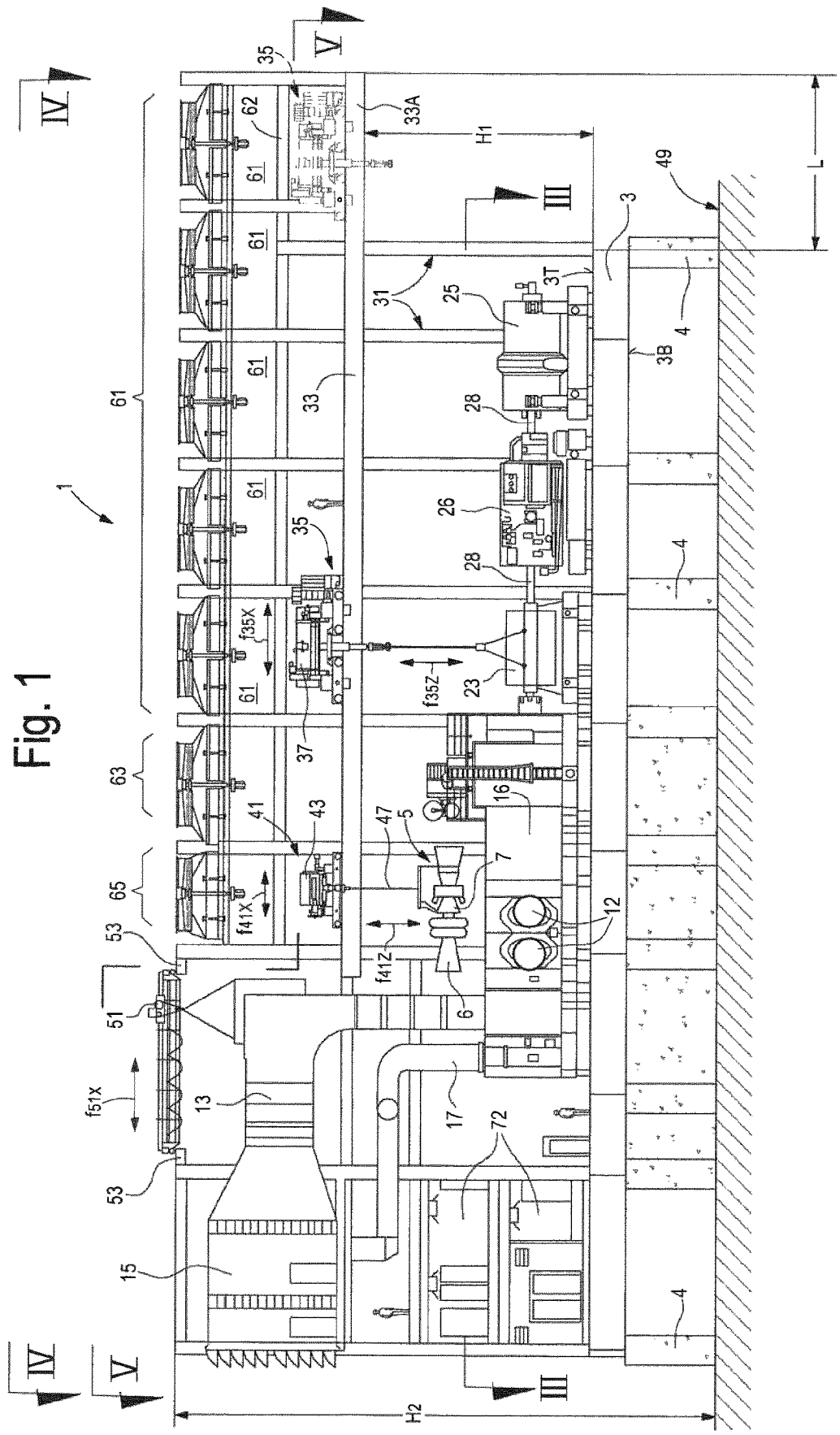
FIG. 1 illustrates a sectional view of a modularized gas turbine system according to line I-I of FIG. 3.

The following detailed description of exemplary embodiments refers to the accompanying drawings. The same reference numbers in different drawings identify the same or similar elements. Additionally, the drawings are not necessarily drawn to scale. Also, the following detailed description does not limit embodiments of the invention. Instead, the scope of embodiments of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

According to embodiments disclosed herein, a modular gas turbine system 1 is provided, which comprises a base plate 3, whereon several instrumentalities and pieces of machinery are installed. The base plate 3 comprises a top surface 3T and a bottom surface 3B. The base plate 3 can be comprised of a lattice of longitudinal and transversal beams. In some embodiments, the structure of the base plate 3 can be configured as disclosed in US2015/0184591, the content whereof is incorporated herein by reference. The base plate 3 is anchored on a supporting structure 4, e.g. made of reinforced concrete.

On the top surface 3T of the base plate 3 a gas turbine engine 5 can be mounted. The gas turbine engine 5 can have a rated power of between about 40 MW and about 150 MW. Exemplary gas turbine engines 5 that can be used in systems according to the present disclosure can be, but are not limited to LM6000 and LMS100 aero-derivative gas turbines, or MS6001, MS7001 and MS9001 heavy duty gas turbines, all available from General Electric, USA.

Figure 3:
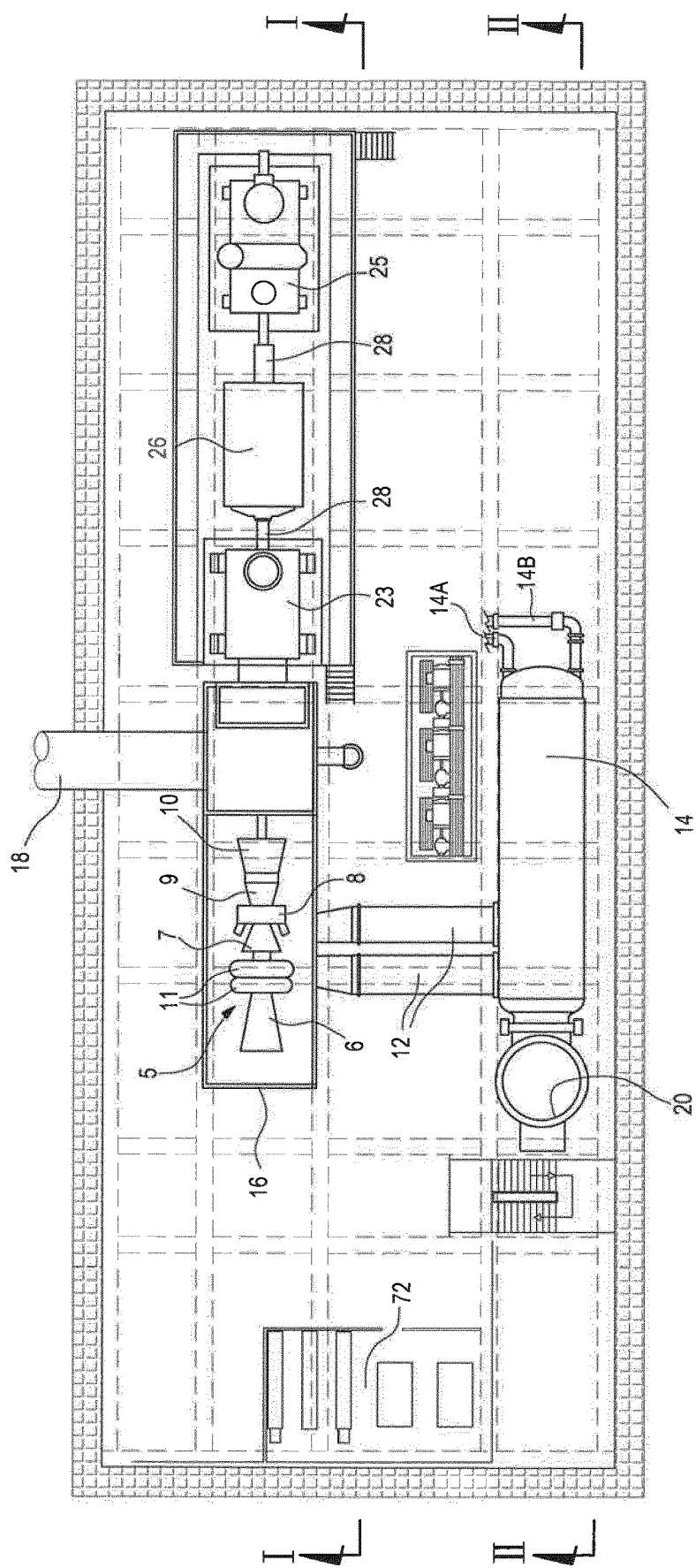
FIG. 3 illustrates a sectional view of the modularized gas turbine system according to line of FIG. 1.

In the exemplary embodiment of FIG. 3, a configuration using an LMS100 aero-derivative gas turbine is shown. The gas turbine engine 5 can be comprised of a low pressure compressor section 6, a high pressure compressor section 7, a combustor section 8, a high pressure turbine section 9 and a low pressure turbine section 10. An intercooler 14 can be fluidly coupled to the delivery side of the low-pressure compressor section 6 and receive partly compressed air therefrom. Cooled, partly compressed air is returned from the intercooler to the high pressure compressor section 7. Reference number 11 (FIG. 3) schematically illustrate a fluid coupling to air intercooler air ducts 12, which connect the compressor sections 6 and 7 to intercooler 14. While in the exemplary embodiment disclosed herein the gas turbine engine 5 is an aero-derivative gas turbine engine, in other exemplary embodiments, not shown, a heavy-duty gas turbine can be used instead.

The gas turbine engine 5 and some of the auxiliaries thereof can be housed in a gas turbine enclosure 16.

The inlet of the compressor section 7 is in fluid communication with a clean air duct 13, extending between an air filter housing 15 and the gas turbine engine 5. In some embodiments, as shown in the attached drawings, the air filter housing 15 is mounted on the same base plate 3, which supports the gas turbine engine 5. In other embodiments, not shown, the air filter housing 15 can be mounted on a separate base plate or skid. However, installing the air filter housing 15 on the base plate 3 along with the gas turbine engine 5 can provide additional advantages, as will become apparent from the description herein below of a method of installing and commissioning the gas turbine system, as well as for maintenance purposes.

Under the air filter housing 15 a control and electrical room 72 for the gas turbine engine 5 can be arranged. The control and electrical room 72 can be arranged at two levels, to occupy less surface on the base plate 3.

The gas turbine engine 5 can be further provided with a ventilation duct 17, wherefrom cooling air is delivered to the gas turbine enclosure 16.

In some embodiment, the gas turbine engine 5 can be provided with an exhaust gas stack for discharging exhaust combustion gas in the environment. The exhaust gas stack (not shown) can be mounted on the same base plate 3 along with the gas turbine engine 5. In other embodiments, the exhaust gas stack can be mounted on a separate skid, which can be supported on the base plate 3 or, more particularly, on a separate base plate, not shown, which can further support a waste heat recovery exchanger, as well as other pieces of machinery, e.g. of an LNG system, thus forming a separate process module. An exhaust gas duct 18 connects the gas turbine engine 5 to the exhaust gas stack (not shown).

Figure 2:
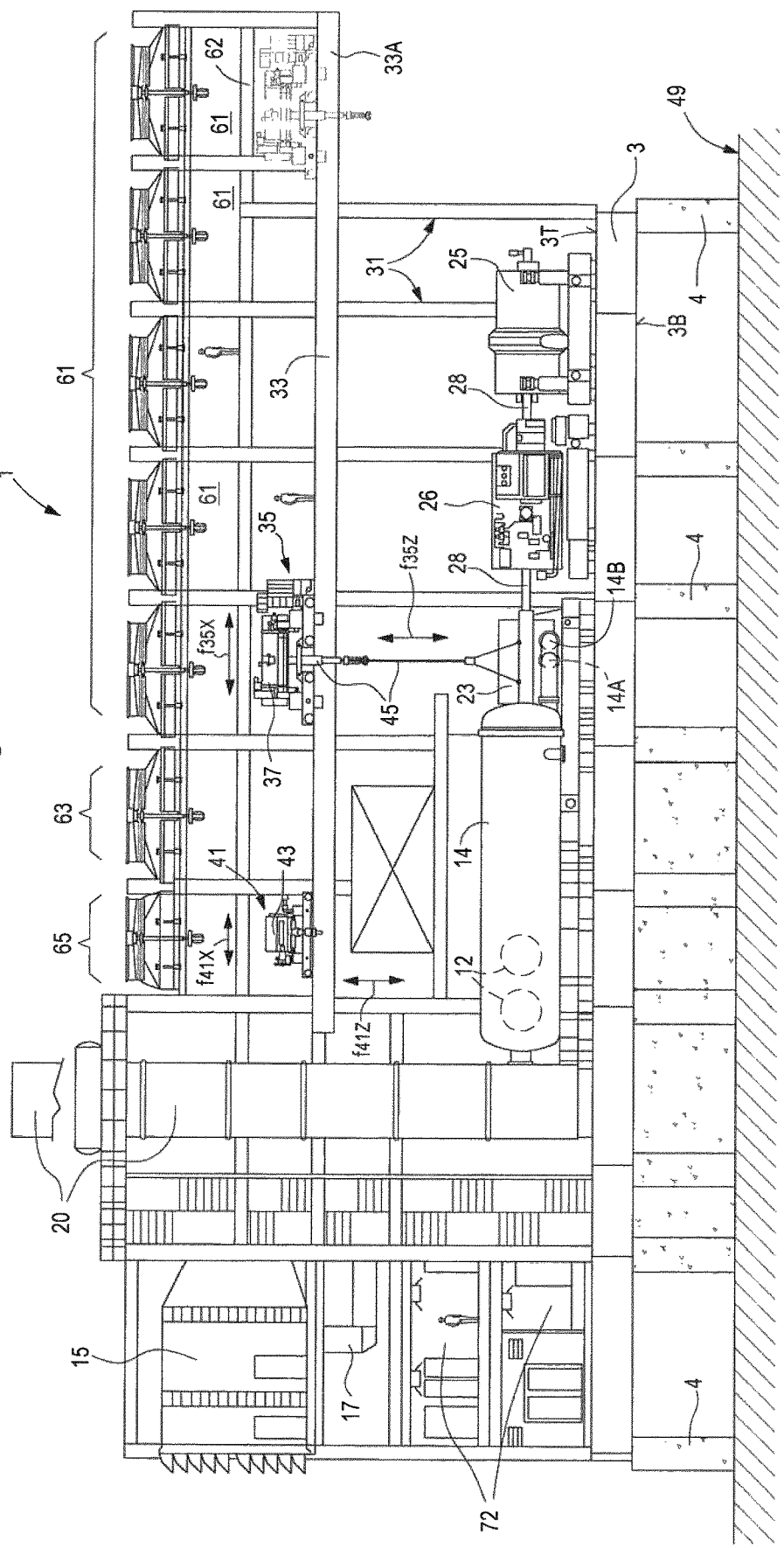
FIG. 2 illustrates a sectional view of the modularized gas turbine system of FIG. 1 according to line II-II of FIG. 3.

The gas turbine engine 5 is mechanically coupled to a load. In embodiments disclosed herein, the load comprises one or more compressors. In FIGS. 1 to 3 the load comprises a compressor train comprised of a first compressor 23 and a second compressor 25. A shaft line 28 extends from the gas turbine engine 5 to the last compressor 25. According to some embodiments, additional machines, other than turbomachines, can be arranged along the shaft line 28. For instance, between the first compressor 23 and the second compressor 25 an electric generator 26 can be arranged. In other embodiments, a reversible electric machine 26 can be used, which can operate as an electric motor and as an electric generator, selectively. The sequence of rotary machines 23, 25 and 26 forming the rotating load driven by the gas turbine engine 5 can be arranged different; e.g. the electric machine 26 can be arranged at the end of the shaft line, or between the gas turbine engine 5 and the first compressor 23.

The electric generator 26 can convert a surplus of mechanical power, generated by the gas turbine engine 5 and exceeding the power required to drive the compressors 23, 25 into electric power, which can be delivered to the electric power distribution grid, e.g. through a variable frequency driver, if needed. If a reversible electric machine 26 is used, the electric machine can be switched into a motor mode, if the power generated by the gas turbine engine 5 is not sufficient to drive the compressors 23, 25.

In some embodiments, the compressors 23, 25 can be refrigerant compressors, which compress a refrigerant gas of an LNG plant, used to cool and liquefy natural gas for transportation purposes, for instance. The LNG circuit, apart from the compressors, can be installed on a separate base plate, placed on a side of base plate 3 and not shown.

In further embodiments, a different number and kind of rotary machines can be mechanically coupled to the gas turbine engine 5, for instance only turbomachines, e.g. one, two or more compressors can be mechanically driven by the gas turbine engine 5.

In yet further embodiments, a helper different from an electric motor or a reversible electric machine can be drivingly coupled to the shaft line 28. For instance, a steam turbine can be used as a helper, if a source of steam is available in the plant, whereof the gas turbine engine 5 and the compressors 23, 25 form part.

If the various pieces of equipment arranged along the shaft line 28 are to be driven at different rotational speeds, one or more gear boxes or other speed manipulating devices can be located along the shaft line 28, such that different pieces of equipment can rotate at different speeds. Variable speed transmissions can be used, instead of gear boxes, if one or more of the rotating machines coupled to the shaft line 28 require to be operated at variable speeds.

According to some embodiments, one or both compressors 23, 25 can be BCL-series, barrel-type centrifugal compressors. A BCL compressor comprises a barrel with a horizontal axis and a front closure flange. The compressor rotor, including the impellers of the compressor, and the stationary components of the compressor, i.e. the diaphragms forming the diffusers and the return channels, can be extracted according to an extraction movement parallel to the rotation axis of the compressor, i.e. parallel to the axis of the barrel.

In other embodiments, one or both compressors 23, 25 can be MCL-series, horizontally split centrifugal compressors. In particular, the casing of an MCL compressor comprises two casing portions connectable to each other along a horizontal plane. The inner components of the compressor, i.e. the diaphragms and the rotor, can be removed by lifting the upper casing portion, without the need for moving the lower casing portion.

In yet further embodiments, a first one of said compressors 23, 25 can be an MCL-series, horizontally split centrifugal compressor and the other compressor can be a BCL-series centrifugal compressor. The BCL-series compressor can be arranged, in an embodiment, at the end of the shaft line 28, such that the barrel can be opened and the inner components of the compressor can be removed without dismantling the barrel.

If the compressor train comprises only one compressor, this latter can be either a horizontally split compressor, or a BCL compressor. In this manner, maintenance of the compressor is made easier. Indeed, the compressor casing of any one of said compressors of the compressor train can be opened, e.g. for maintenance or repairing purposes, without removing the compressor from the shaft line 28.

According to some embodiments, a supporting frame 31 extends from the top surface 3T of the base plate 3 up to a level higher than the air filter housing 15. At a first height H1 of the supporting frame 31, rails 33 for a first bridge crane 35 (i.e. overhead crane) are located, see in particular FIG. 5. The first bridge crane 35 is movable along rails 33 according to double arrow f35x in a direction substantially parallel to the rotation axis of the gas turbine engine 5 and of the shaft line 28. The first bridge crane 35 comprises a hoist 37, which is movable according to double arrow f35y, in a direction substantially orthogonal to the rotation axis of the gas turbine engine 5. The hoist 37 can be arranged on a trolley, which moves according to double arrow f35y along beams 39 of the bridge crane 35.

According to embodiments disclosed herein, a second bridge crane 41 can move along the same rails 33. The second bridge crane, or overhead crane, 41 can move according to double arrow f41x in a direction substantially parallel to the rotation axis of the gas turbine engine 5. A hoist 43 moves along beams 45 in a direction f41y, substantially orthogonal to the rotation axis of the gas turbine engine 5. The lifting capability of the second bridge crane 41 can be lower than the lifting capability of the first bridge crane 35.

As shown in FIGS. 1 and 2, the hoists operate ropes 47 with hooking members movable in a vertical direction according to double arrow f35z and f41z, respectively. The rails 33 extend beyond the footprint of the base plate 3, as can be seen in FIGS. 1 and 2. A portion 33A of the rails 33 cantileverly overhangs from the supporting frame 31 over a first lay down area 49. The length L of the overhanging portion 33A of the rails 33 is, in an embodiment, sufficient for allowing the first bridge crane 35 but not the second bridge crane 41 to move according to arrow f35x entirely outside the footprint of the base plate 3.

The first bridge crane 35 can be dimensioned and designed for handling heavier pieces of machinery such as the turbomachines 23, 25 and the electric machine 26 forming the load driven by the gas turbine engine 5. The second bridge crane 41 can be smaller than the first bridge crane 35 and can have a reduced lifting capability, since it can be used to lift and move components of the gas turbine engine 5, which are usually lighter than the machinery components of the load drivingly coupled to the gas turbine engine 5.

Since the first and second bridge cranes 35, 41 move along the same, common rails 33, areas which can be reached by the second bridge crane 41 cannot be reached by the first bridge crane 35, and vice-versa. For instance, the portion of rails 33 above the lay down area 49 can only be reached by the first bridge crane 35, while the area above the gas turbine engine 5 can be reached only by the second bridge crane 41. In order to move machine components from the area where the gas turbine engine 5 is arranged to the first lay down area 49 and vice-versa, the two bridge cranes 41, 35 can operate in combination, moving machine components from the area of action of one bridge crane towards the area of action of the other bride crane.

The two bridge cranes 35, 41 can also operate in parallel, each one in its own area of operation, so that a plurality of maintenance operations in different areas of the gas turbine system 1 can be performed simultaneously, thus reducing the overall time required and increasing the availability of the system.

According to some embodiments, a third bridge crane 51 can be placed on rails 53, which are supported by the supporting frame 31 and extend substantially orthogonal to the rotation axis of the gas turbine engine 5 and to the shaft line 28. The third bridge crane 51 moves according to double arrow f51y in a direction parallel to the rails 53. The third bridge crane 51 further moves according to double arrow f51x along beams 55, which extend substantially parallel to the gas turbine engine 5. The rails 53 can overhang in a cantilever beyond the footprint of the base plate 3. A portion 53A of the rails 53 project from the supporting frame 31 above a second lay down area 57. As can best be appreciated from FIG. 4, for instance, the third bridge crane 51 can thus move above the clean air duct 13 and therefrom towards and above the second lay down area 57, and can be used for purposes of maintenance of the clean air duct 13 and of the air inlet plenum of the compressor section 6 of the gas turbine engine 5.

In some embodiments, the rails 53 are arranged at a height H2, which is higher than the height H1 where the rails 33 is located, along which the first and second bridge cranes 35, 41 run.

The third bridge crane 51 can operate in parallel with the first bridge crane 35 and/or with the second bridge crane 41, so that maintenance operations on the portion of the gas turbine system reached by the third bridge crane 51 can be carried out in parallel with maintenance interventions on the remaining part of the system, using the first and second bridge cranes 35, 41.

When an intercooler 14 is provided, for cooling partly compressed air between the low-pressure compressor section 6 and the high-pressure compressor section 7, a heat removal fluid circulates through inlet and outlet manifolds 14A, 14B in heat exchange relationship with the air flowing through the intercooler 14. The heat removal fluid is in turn cooled in secondary coolers 61, e.g. by means of heat exchange with ambient air. The secondary coolers 61 are arranged on a ceiling 62 of the supporting frame 31, at a height above the rails 33, such that the total footprint of the gas turbine system 1 is reduced. Further coolers 63 and 65 can be provided, for cooling synthetic lube oil and mineral lube oil used in the rotary machines of gas turbine system 1. These further coolers can be arranged adjacent the secondary coolers 61 at the same height above the level where the first and second bridge cranes 35, 41 are arranged and moved.

The intercooler 14 can be provided with a blow-out combustion air stack 20, through which partly compressed air is blown out in case of shut down of the gas turbine engine.

The modular gas turbine system 1 can be assembled, commissioned and tested at an assembling, commissioning and testing site, and then shipped at the final destination, without disassembling the major part of the mechanical, electrical and hydraulic connections, for instance the connections with the control and electrical room of the gas turbine engine, such that starting the system at the final site of use is made faster and easier, with less if no requirement for specialized staff. The presence of bridge cranes as integral components of the modularized gas turbine system 1 makes handling of the system components easier, both at the first installation as well as during maintenance interventions. The time required for maintenance is made shorter and thus availability of the entire system is improved.

If required, some of the components of the system can be disassembled prior to shipping, in particular if this becomes necessary or expedient for logistic purposes. For instance, the compressor(s) can be detached from the gas turbine engine. An interface along the shaft line between the gas turbine engine and the compressor(s) can be provided, which makes disconnection and connection of the compressor to the gas turbine engine easier. In some embodiments, a separable base plate portion can be provided, whereon the compressor(s) is/are mounted. The separable base plate portion can be assembled with the remaining part of the base plate at the time of assembling, commissioning and testing. Thereafter, the separable base plate portion can be separated from the remaining part of the base plate and shipped separately. Re-assembling will take place at the final site of use.

Many modifications and variants of the system can be envisaged. For instance, in simpler embodiments, only two bridge cranes can be provided, rather than three. For example, only bridge cranes 35 and 41 can be provided. The rails 33 can be placed at a higher level and extended towards the air filter housing 15, so that e.g. bridge crane 41 can be moved above the clean air duct 13 to handle components of the clean air circuit. In other embodiments, only the first bridge crane 35 and the second bridge crane 51 can be provided, movable along orthogonally arranged, separate rails 33, 53.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A transportable modular gas turbine system, comprising:
    a base plate;
    a gas turbine engine having a rotation axis, mounted on the base plate;
    at least one rotating load, mechanically coupled to the gas turbine engine and mounted on the base plate;
    a supporting frame extending above the base plate;
    a first bridge crane movably supported on the supporting frame;
    a second bridge crane movably supported on the supporting frame,
    wherein the first bridge crane is movable along first rails extending substantially parallel to the rotation axis of the gas turbine engine and the second bridge crane is movable along second rails extending substantially orthogonal to the rotation axis of the gas turbine engine.

2. A transportable modular gas turbine system, comprising:
    a base plate;
    a gas turbine engine having a rotation axis, mounted on the base plate;
    at least one rotating load, mechanically coupled to the gas turbine engine and mounted on the base plate;
    a supporting frame extending above the base plate;
    a first bridge crane movably supported on the supporting frame;
    a second bridge crane movably supported on the supporting frame,
    wherein at least one of said first bridge crane and second bridge crane is movable on first rails extending substantially parallel to the rotation axis of the gas turbine engine and projecting horizontally beyond the footprint of the base plate, up to a lay down area arranged on a side of the base plate.

3. A transportable modular gas turbine system, comprising:
    a base plate;
    a gas turbine engine having a rotation axis, mounted on the base plate;
    at least one rotating load, mechanically coupled to the gas turbine engine and mounted on the base plate;
    a supporting frame extending above the base plate;
    a first bridge crane movably supported on the supporting frame;
    a second bridge crane movably supported on the supporting frame,
    wherein the first bridge crane has a lifting capacity higher than the second bridge crane; the first bridge crane and the second bridge crane are movable on common rails mounted on the supporting frame; the rails extend substantially parallel to the rotation axis of the gas turbine engine and having an end portion projecting horizontally beyond the footprint of the base plate up to a lay down area arranged on a side of the base plate; and the first bridge crane is movably arranged between the second bridge crane and said end portion of the rails.

4. A transportable modular gas turbine system, comprising:
    a base plate;
    a gas turbine engine having a rotation axis, mounted on the base plate;
    at least one rotating load, mechanically coupled to the gas turbine engine and mounted on the base plate;
    a supporting frame extending above the base plate;
    a first bridge crane movably supported on the supporting frame;
    a second bridge crane movably supported on the supporting frame; and
    a third bridge crane movably supported on the supporting frame,
    wherein the first bridge crane and the second bridge crane are movably arranged on first rails supported by the supporting frame and the third bridge crane is movably arranged on second rails supported by the supporting frame.

5. The modular gas turbine system of claim 4, wherein the first rails and the second rails are substantially orthogonal to one another.

6. The modular gas turbine system of claim 5, wherein the first rails extend substantially parallel to the rotation axis of the gas turbine engine, and the second rails extend substantially orthogonal to the rotation axis of the gas turbine engine.

7. The modular gas turbine system of claim 6, further comprising an air filter housing and an air inlet duct extending from the air filter housing towards the gas turbine engine; and wherein the second rails extend above the air inlet duct.

8. The modular gas turbine system of claim 4, wherein the second rails project horizontally beyond the footprint of the base plate, up to a lay down area arranged on a side of the base plate.

9. The modular gas turbine system of claim 4, wherein the second rails are arranged at a height above the first rails.

10. A transportable modular gas turbine system, comprising:
- a base plate;
- a gas turbine engine having a rotation axis, mounted on the base plate;
- at least one rotating load, mechanically coupled to the gas turbine engine and mounted on the base plate;
- a supporting frame extending above the base plate;
- a first bridge crane movably supported on the supporting frame;
- a second bridge crane movably supported on the supporting frame,
- wherein the gas turbine engine comprises an air intercooler, in which partly compressed air from a first compressor section of the gas turbine engine is cooled in heat exchange relationship with a heat removal fluid; and wherein a plurality of secondary coolers are arranged on the supporting frame and are fluidly connected with the intercooler, the heat removal fluid being in heat exchange relationship with a cooling medium in the secondary coolers.

11. The modular gas turbine system of claim 10, wherein the first bridge crane and the second bridge crane are movable on common rails mounted on the supporting frame.

12. The modular gas turbine system of claim 10, wherein at least one of the first bridge crane and second bridge crane is movable on rails extending substantially parallel to a rotation axis of the gas turbine engine.

13. The modular gas turbine system of claim 10, wherein the first bridge crane has a lifting capacity higher than the second bridge crane.

14. The modular gas turbine system of claim 10, wherein the secondary coolers are air coolers, and wherein the heat removal fluid is in heat exchange relationship with cooled ambient air in said secondary coolers.

15. The modular gas turbine system of claim 10, wherein the rotating load comprises at least one gas compressor.

16. The modular gas turbine system of claim 15, wherein the gas compressor is a refrigerant gas compressor of an LNG system.

* * * * *